(12) United States Patent
Jules et al.

(10) Patent No.: US 10,173,319 B1
(45) Date of Patent: Jan. 8, 2019

(54) SUGGESTING, SELECTING, AND APPLYING TASK-LEVEL MOVEMENT PARAMETERS TO IMPLEMENTATION OF ROBOT MOTION PRIMITIVES

(71) Applicant: X Development LLC, Mountain View, CA (US)

(72) Inventors: Anthony Sean Jules, Oakland, CA (US); Johan Ulrich Lewin Jessen, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 13 days.

(21) Appl. No.: 15/617,730

(22) Filed: Jun. 8, 2017

Related U.S. Application Data

(63) Continuation of application No. 14/724,207, filed on May 28, 2015, now Pat. No. 9,707,680.

(51) Int. Cl.
*B25J 9/16* (2006.01)

(52) U.S. Cl.
CPC ... *B25J 9/1661* (2013.01); *G05B 2219/40099* (2013.01); *G05B 2219/40113* (2013.01)

(58) Field of Classification Search
CPC ......... B25J 9/1661; G05B 2219/40099; G05B 2219/40113
See application file for complete search history.

(56) References Cited

U.S. PATENT DOCUMENTS

| | | | |
|---|---|---|---|
| 5,499,320 A | 3/1996 | Backes | |
| 6,167,328 A | 12/2000 | Takaoka et al. | |
| 6,218,802 B1 | 4/2001 | Onoue et al. | |
| 8,073,564 B2 | 12/2011 | Bruemmer et al. | |
| 8,160,746 B2 | 4/2012 | Wang et al. | |
| 8,355,818 B2 | 1/2013 | Nielsen et al. | |
| 8,410,732 B2 | 4/2013 | Kassow et al. | |
| 8,700,197 B2 | 4/2014 | Plociennik et al. | |

(Continued)

OTHER PUBLICATIONS

Hogan, Neville; Impedance Control: An Approach to Manipulation; Journal of Dynamic Systems, Measurement, and Control; pp. 1-24; Mar. 1985; US.

(Continued)

*Primary Examiner* — Nicholas Kiswanto
(74) *Attorney, Agent, or Firm* — Middleton Reutlinger

(57) ABSTRACT

Methods, apparatus, systems, and computer-readable media are provided for determining, based on a task to be performed by a robot and past behavior by robots while performing tasks similar to the task, a suggested task-level movement parameter for application to movement of the robot while performing the task; providing output indicative of the suggested task-level movement parameter; receiving input indicative of user selection of the suggested task-level movement parameter or a user-defined task-level movement parameter; determining, based on the received input, an actual task-level movement parameter to be applied to movement of the robot while performing the task; and identifying, based on the actual task-level movement parameter, a plurality of component-level movement parameters to be applied to a plurality of motion primitives implemented by one or more operational components of the robot to perform the task.

20 Claims, 6 Drawing Sheets

(56) References Cited

U.S. PATENT DOCUMENTS

| | | | |
|---|---|---|---|
| 8,868,241 B2 | 10/2014 | Hart et al. | |
| 8,930,019 B2 | 1/2015 | Allen et al. | |
| 9,272,418 B1* | 3/2016 | Guerin | B25J 9/1664 |
| 2004/0221238 A1* | 11/2004 | Cifra | G05B 19/0426 |
| | | | 715/762 |
| 2007/0150102 A1* | 6/2007 | Park | B25J 9/1661 |
| | | | 700/245 |
| 2007/0168082 A1 | 7/2007 | Kim et al. | |
| 2009/0143912 A1 | 6/2009 | Wang et al. | |
| 2009/0210090 A1* | 8/2009 | Takemitsu | B25J 9/1661 |
| | | | 700/245 |
| 2010/0145514 A1* | 6/2010 | Kim | B25J 9/161 |
| | | | 700/248 |
| 2010/0261526 A1 | 10/2010 | Anderson et al. | |
| 2011/0071676 A1 | 3/2011 | Sanders et al. | |
| 2011/0238211 A1 | 9/2011 | Shirado et al. | |
| 2011/0288667 A1 | 11/2011 | Noda et al. | |
| 2012/0072019 A1* | 3/2012 | Sanders | B25J 9/1661 |
| | | | 700/245 |
| 2012/0136481 A1 | 5/2012 | Maisonnier et al. | |
| 2012/0253512 A1* | 10/2012 | Sato | B25J 9/1669 |
| | | | 700/245 |
| 2013/0024025 A1 | 1/2013 | Hsu | |
| 2013/0096719 A1 | 4/2013 | Sanders et al. | |
| 2014/0067124 A1 | 3/2014 | Williamson et al. | |
| 2014/0214203 A1 | 7/2014 | Inoue | |
| 2014/0249676 A1 | 9/2014 | Florencio et al. | |
| 2014/0298231 A1* | 10/2014 | Saito | G06F 3/0484 |
| | | | 715/771 |
| 2014/0344004 A1 | 11/2014 | Surendran | |
| 2014/0350725 A1 | 11/2014 | LaFary et al. | |

OTHER PUBLICATIONS

Ryan, Michael; Implementation of Robotic Force Control with Position Accommodation; Cirsse Report #118; Rensselaer Polytechnic Institute; Jun. 1992; US; 100 pages.

Khansari-Zadeh, et al.; Modeling Robot Discrete Movements with State-varying Stiffness and Damping: A Framework for Integrated Motion Generation and Impedance Control; LASA Laboratory, Ecole Polytechnique Federale de Lausanne (EPFL); 2014; CH; 10 pages.

* cited by examiner

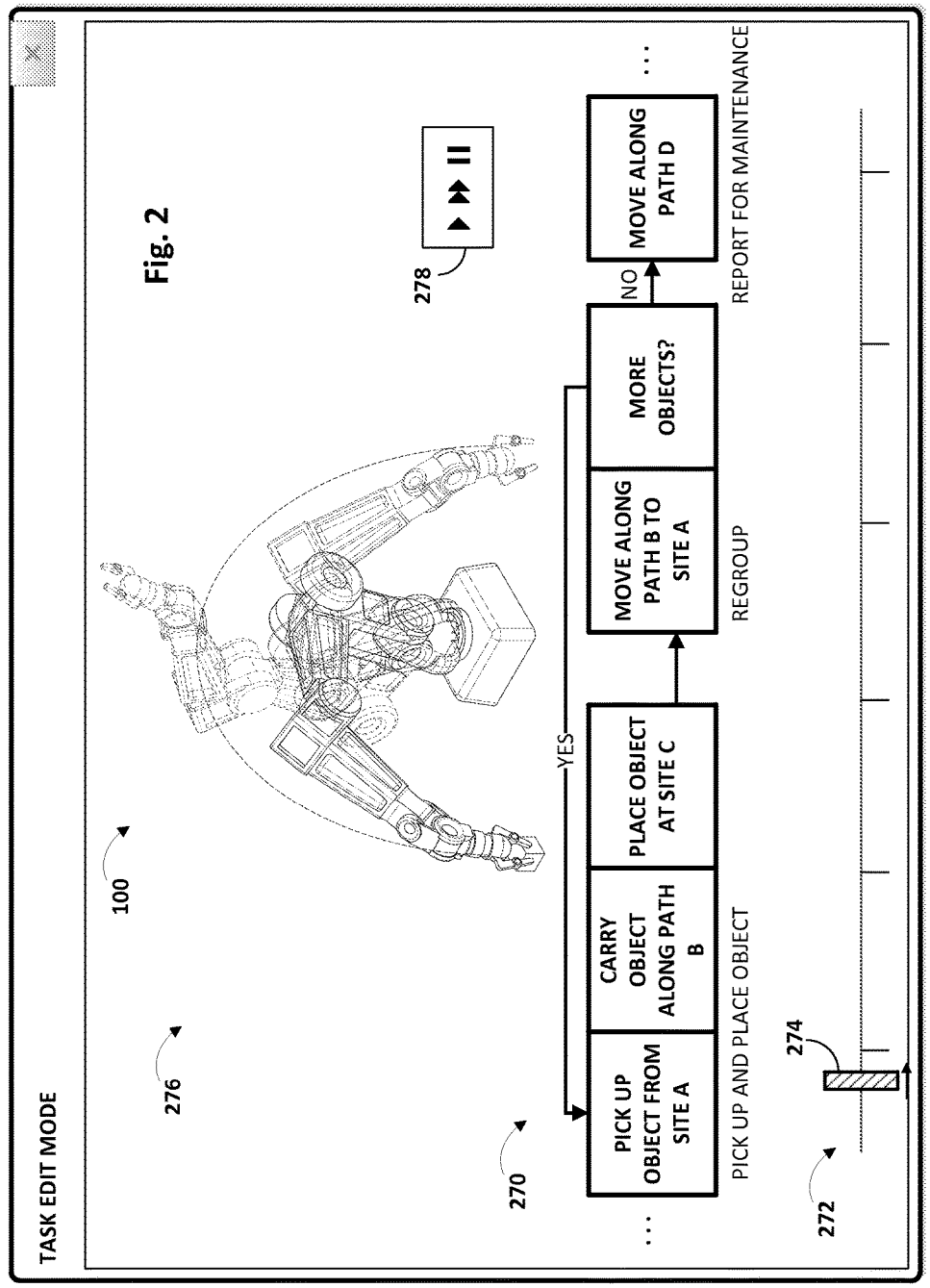

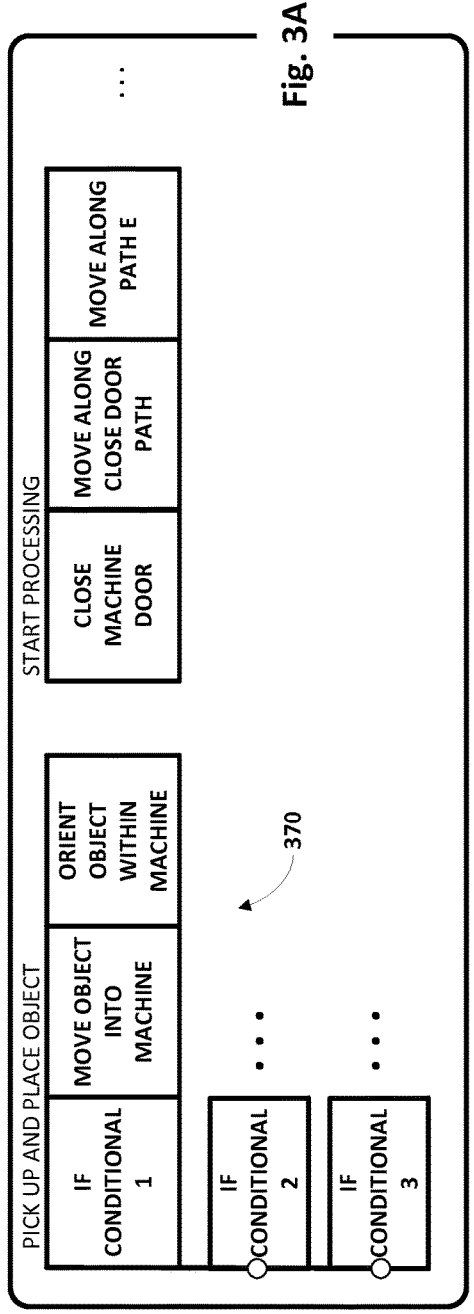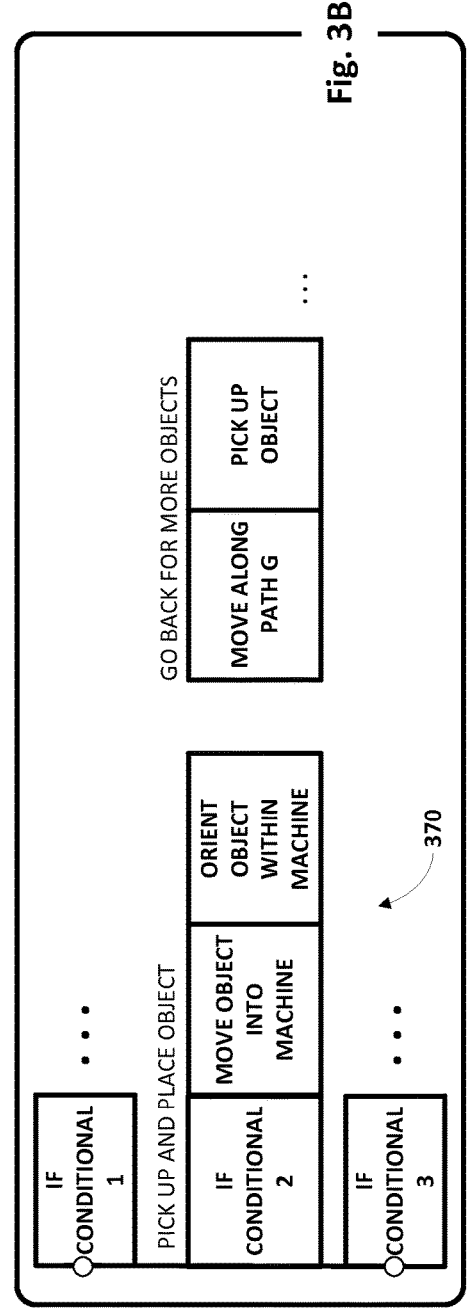

US 10,173,319 B1

SUGGESTING, SELECTING, AND APPLYING TASK-LEVEL MOVEMENT PARAMETERS TO IMPLEMENTATION OF ROBOT MOTION PRIMITIVES

BACKGROUND

A robot may perform a task within an environment in various manners, depending on the capabilities of the robot, one or more attributes of the task, one or more attributes of an object to be acted upon, and/or one or more attributes of the environment. For example, a robot may be assigned a task of collecting an object at a first location and depositing the object at a second location. Suppose the object is fragile (e.g., an egg), that the deposit location is not precisely known, or that an attribute of the object makes it react poorly to sudden or swift motion (e.g., the object is a full wine glass). Under any of these circumstances, it may be preferable for the robot to move slowly, deliberately, and/or to emulate a relatively low level of impedance (i.e. stiffness) towards its environment. By contrast, if the object is non-fragile and/or relatively heavy, then it may be preferable for the robot to move more deliberately and/or to emulate a relatively high level of impedance towards its environment.

SUMMARY

The present disclosure is generally directed to methods, apparatus, and computer-readable media (transitory and non-transitory) for determining a suggested task-level movement parameter to be applied to movement of a robot while it performs a task. The suggested task-level movement parameter may be determined based on one or more of the nature of the task, one or more attributes of the environment in which the robot is to perform the task, one or more attributes of an object to be acted upon by the robot while performing the task, and past behavior by robots while performing tasks similar to the task. The suggested task-level movement parameter may be presented to a user (e.g., a robot technician), e.g., in a graphical user interface. In various implementations, the user may accept or modify the suggested task-level movement parameter as an actual task-level movement parameter, or completely define a custom actual task-level movement parameter. The actual task-level movement parameter may then be used to identify a plurality of component-level movement parameters to be applied to a plurality of motion primitives implemented by one or more operational components of the robot to perform the task.

Suggesting, selecting, and applying task-level movement parameters to implementation of robot motion primitives provides various technical advantages. For example, suggesting a task-level movement parameter based on one or more attributes of the environment in which a robot is to perform a task, particularly when those attributes pertain to an object to be acted upon by the robot while performing the task, may relieve users from the burden of having to define a task-level movement parameter on their own. It may also save absent-minded users from accidently causing the robot to perform a task without applying appropriate movement parameters, which otherwise might cause damage to the robot and/or to the environment.

In some implementations, a computer implemented method may be provided that includes the steps of: determining, by one or more processors, a task to be performed by a robot in an environment; determining, by one or more of the processors, based on the task to be performed by the robot and past behavior by robots while performing tasks similar to the task, a suggested task-level movement parameter for application to movement of the robot while performing the task; providing, by one or more of the processors, via a graphical user interface, an indication of the suggested task-level movement parameter; receiving, by one or more of the processors, via the graphical user interface, a selection of the suggested task-level movement parameter or a user-defined task-level movement parameter; determining, by one or more of the processors, based on the received selection, an actual task-level movement parameter to be applied to movement of the robot while performing the task; identifying, by one or more of the processors, based on the actual task-level movement parameter, a plurality of component-level movement parameters to be applied to a plurality of motion primitives implemented by one or more operational components of the robot to perform the task; and operating, by one or more of the processors, the one or more operational components of the robot to implement the plurality of motion primitives pursuant to the plurality of component-level movement parameters.

This method and other implementations of technology disclosed herein may each optionally include one or more of the following features.

In various implementations, the method may further include determining, by one or more of the processors, one or more physical attributes of an object to be acted upon by a robot while the robot performs the task. In various implementations, the suggested task-level movement parameter may be determined based on past behavior by robots while acting upon objects similar to an object to be acted upon by the robot while performing the task. In various implementations, the suggested task-level movement parameter may be determined based on past behavior by robots while operating in environments similar to the environment in which the robot is to perform the task.

In various implementations, identifying the plurality of component-level movement parameters may include: identifying, by the one or more processors, based on the actual task-level movement parameter, a plurality of action-level movement parameters to be applied to a plurality of actions implemented by the robot to perform the task; and identifying, by the one or more processors, based on a given action-level movement parameter of the plurality of action-level movement parameters, one or more component-level movement parameters to be applied to one or more motion primitives implemented by one or more operational components of the robot to perform a given action associated with the given action-level movement parameter. In various implementations, the method may further include selecting, by the one or more processors, based on one or more of the actual task-level movement parameter and the given action-level movement parameter, a sensitivity of an error condition associated with the given action, wherein the robot transitions from performing the given action to performing an error condition action on satisfaction of the error condition.

In various implementations, determining the suggested task level movement may be based at least in part on output from a machine learning model that is trained using training examples of past instances of the robot or other robots performing the tasks similar to the task. In various implementations, the identifying may include: identifying, based on the actual task-level movement parameter, a first component-level movement parameter to be applied to a first motion primitive implemented by a first operational component of the robot to perform the task; and identifying, based on the actual task-level movement parameter, a second component-level movement parameter to be applied to a second motion primitive implemented by a second component of the robot to perform the task;

In various implementations, the first component-level movement parameter may affect operation of the first operational component differently than the second component-level movement parameter affects operation of the second operational component. In various implementations, the method may further include rendering, by the one or processors, as an element of the graphical user interface, a directed graph with a graphical element to represent the task. In various implementations, the method may further include rendering, by the one or more processors, as elements of the directed graph, additional graphical elements representing at least two actions, wherein the at least two actions together form at least part of the task. In various implementations, the graphical element may be a first graphical element, the task may be a first task, and the method may further include: rendering, by the one or processors, as part of the directed graph, a second graphical element representing a second task. In various implementations, the second graphical element may be arranged in the directed graph chronologically before or after the first graphical element based on user input indicative of one of the first and second graphical elements having been dragged to a position preceding or following the other graphical element in the directed graph.

In various implementations, at least one of the plurality of component-level movement parameters may include a measure of force imparted by an operational component of the robot while implementing a motion primitive. In various implementations, at least one of the plurality of component-level movement parameters may include a measure of mechanical impedance emulated by an operational component of the robot towards the environment in which the robot is to perform the task. In various implementations, at least one of the plurality of component-level movement parameters may include a velocity achieved by an operational component of the robot while implementing a motion primitive.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 2, 3A, 3B, and 4 illustrate example graphical user interface elements and/or dialogs that may be provided to a user to control operation of a robot, in accordance with various implementations.

DETAILED DESCRIPTION

Figure 1:
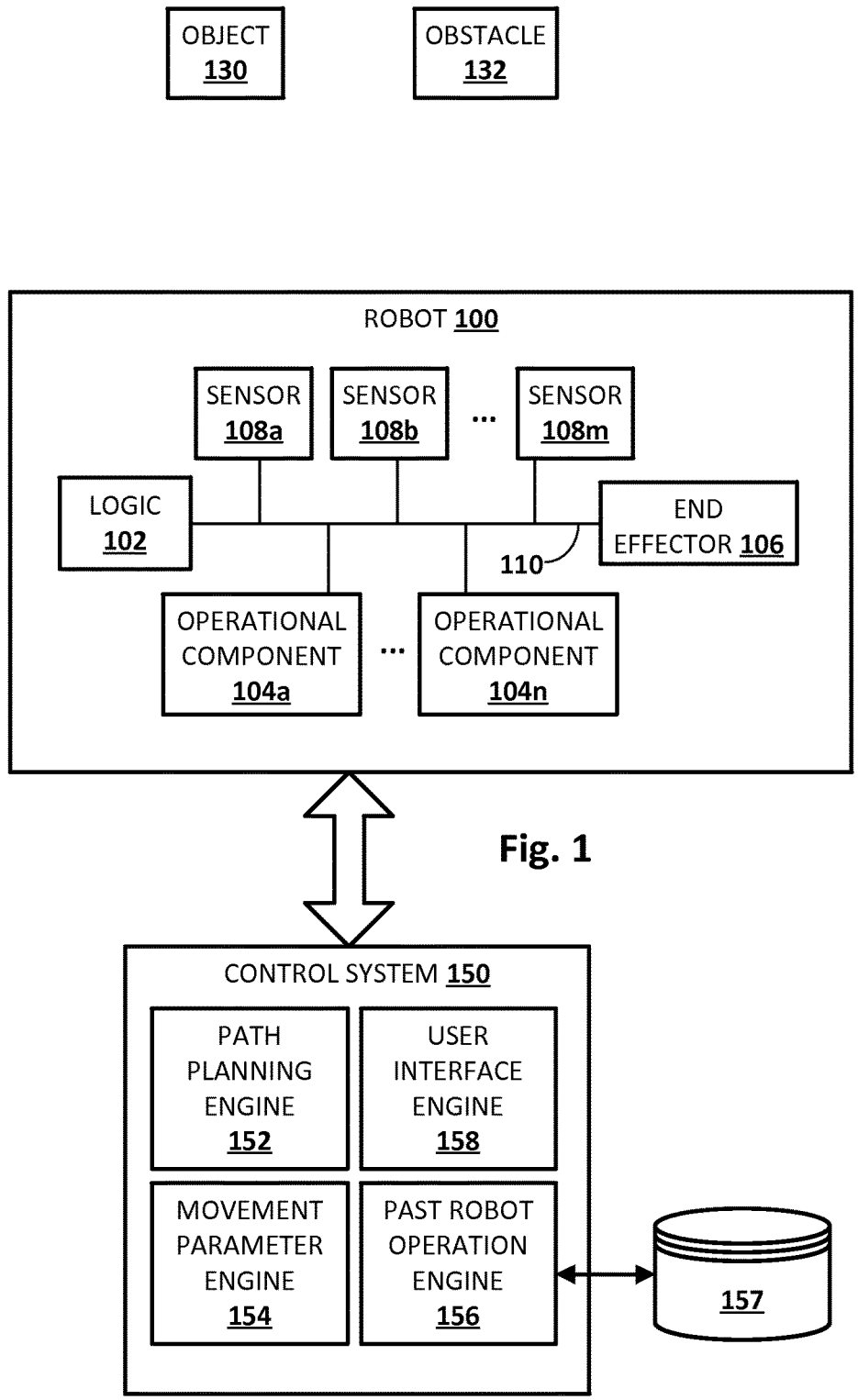
FIG. 1 depicts an example environment in which disclosed techniques may be implemented, in accordance with various implementations.

FIG. 1 is a schematic diagram of an example environment in which selected aspects of the present disclosure may be implemented. A robot 100 may be in communication with a control system 150. Robot 100 may take various forms, including but not limited to a robot arm, a humanoid form, an animal form, a wheeled device, a submersible vehicle, an unmanned aerial vehicle ("UAV"), and so forth. In various implementations, robot 100 may include logic 102. Logic 102 may take various forms, such as one or more processors, one or more field-programmable gate arrays ("FPGA"), one or more application-specific integrated circuits ("ASIC"), one or more so-called "real time controllers," and so forth. In various implementations, logic 102 may be operably coupled with one or more operational components 104*a-n*, one or more end effectors 106, and/or one or more sensors 108*a-m*, e.g., via one or more buses 110.

As used herein, "operational components" 104 of a robot may refer to actuators, motors (e.g., servo motors), joints, shafts, gear trains, pumps (e.g., air or liquid), pistons, drives, or other components that may create and/or undergo propulsion, rotation, and/or motion. Some operational components may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. In FIG. 2, for example, a robot 100 is depicted in the form of a robot arm having an end effector 106 that takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 106 may be removable, and various types of modular end effectors may be installed onto robot 100, depending on the circumstances.

Sensors 108 may take various forms, including but not limited to light sensors (e.g., passive infrared), pressure sensors, pressure wave sensors (e.g., microphones), proximity sensors, torque sensors, radars, range finders, accelerometers, gyroscopes, compasses, Geiger counters, thermometers, barometers, position coordinate sensors (e.g., global positioning system, or "GPS"), speedometers, and so forth. While sensors 108*a-m* are depicted as being integral with robot 100, this is not meant to be limiting. In some implementations, sensors 108 may be located external to, but may be in direct or indirect communication with, robot 100, e.g., as standalone units or as part of control system 150.

Control system 150 may include one or computing systems connected by one or more networks (not depicted) that control operation of robot 100 to various degrees. An example of such a computing system is depicted schematically in FIG. 6. In some implementations, control system 150 exerts a relatively high level of control over robot 100, e.g., in real time in response to signals received by a user interface engine 158 and/or one or more readings from one or more sensors 108. In other implementations, control system 150 exerts less direct control over robot 100. For example, control system 150 may provide robot 100 with high level tasks and/or actions that form the tasks, data indicative of environmental constraints (e.g., obstacles to avoid), and/or other general constraints that robot 100 may be unable to ascertain itself by processing signals from sensors 108. Logic 102 on robot 100 may convert such high level tasks and actions into robot action, e.g., by translating one or more high level tasks and/or actions into a plurality of motion primitives executable by robot 100. Various modules or engines may be implemented as part of control system 150 as software, hardware, or any combination of the two. For example, in FIG. 1, control system 150 includes a path planning engine 152, a movement parameter engine 154, a past robot operation engine 156, and a user interface engine 158.

In various implementations, robot 100 may be assigned one or more high level "tasks" to perform. In some implementations, a task may include at least one "entity" (e.g., area, object, movement path) that is the focus or "objective" of the task. A robot task may be broken down into one or more robot "actions." An action (or "skill") as used herein may refer to a single (e.g., atomic) operation collectively performable by multiple operational components 104 of robot 100. Examples of actions include "move," "push," "grab," "let go," "step down," "step up," and so forth. A robot action or skill may in turn be broken down in a plurality of so-called "motion primitives." A "motion primitive" as used herein may be a fundamental movement or act that may be implemented by a particular operational component 104 of robot 100. For example, operational components 104 may be configured to "rotate" (or rotate other components) about an axis, "extend," "retract," and so forth.

Some examples of tasks for robot 100 may be: "pick up [Action] object [Entity]"; "move [Action] along path #1 [Entity]"; "place [Action] object [Entity 1] into machine [Entity 2]". In some implementations, a task may include a corresponding "task-level movement parameter", which may be a general movement setting applicable across all actions of the task. e.g., "precise and slow," "quickly," "deliberately," and so forth. As will be explained below, task-level movement parameters may be translated into action-level and/or component-level movement parameters.

Referring back to FIG. 1, path planning engine 152 may be configured to identify a plurality of candidate paths traversable by, for instance, end effector 106 of robot 100 to accomplish one or more tasks and/or actions assigned to robot 100. To identify and/or select one or more paths, path planning engine 152 may take into consideration various signals, such as signals indicative of obstacles (both stationary and dynamic) within an environment in which robot 100 operates, signals indicative of one or more capabilities of robot 100 (which may change over time, for instance, based on power drain and/or wear and tear), signals about costs incurred by various operational components of robot 100, signals related to the tasks and/or actions to be performed by robot 100, and so forth.

Movement parameter engine 154 may be configured to determine, based on a variety of signals and/or data points, a so-called "suggested" task-level movement parameter. The signals and/or data points that may be considered by movement parameter engine 154 may include but are not limited to attributes of the task to be performed by robot 100, the environment in which the task is to be performed, and an object to be acted upon by robot 100 during performance of the task (if applicable). For example, if the task is one that is traditionally performed in a careful manner, and/or the environment is confined and/or contains delicate structures or equipment, and/or an object to be acted upon is delicate or fragile, then movement parameter engine 154 may determine a suggested task-level movement parameter that is slow, careful, and/or steady. Movement parameter engine 154 may additionally or alternatively consider historical data, e.g., obtained from past robot operation engine 156. The "suggested" task-level movement parameter 154 may then be provided as output to a user, e.g., via user interface engine 158.

Past robot operation engine 156 may be operably coupled with an index 157 of past robot operation data. Past robot operation engine 156 may be configured to obtain, e.g., from index 157, historical data pertaining to past operation by robots that may be used, for instance, by movement parameter engine 154 to determine a suggested task-level movement parameter. In some implementations, the historical data obtained by past robot operation engine 156 for a particular task may be historical data pertaining to performance by robots in similar circumstances. In some implementations, past robot operation engine 156 may include a machine learning classifier that is trained on positive and/or negative examples of past tasks performed by robots. For example, past robot performance training examples (both positive and negative) could take vector form, such as <task_attr$_1$, . . . , task_attr$_i$, environment_attr$_1$, . . . , environment_attr$_j$, object_attr$_1$, object_attr$_k$, applied_task-level_movement parameter>. A machine learning classifier may compare these training vectors to similar vectors representing a current task to be performed by a robot, to determine a best or acceptable task-level movement parameter to apply.

User interface engine 158 may be configured to facilitate user input of various commands or tasks for robot 100, and/or output of various data, such as the aforementioned suggested task-level movement parameter. In some implementations, user interface engine 158 may provide a graphical user interface rendered on a mobile computing system such as a smart phone or tablet. A user may operate the graphical user interface to control robot 100 to various degrees. For example, to define a robot path, a user may define one or more waypoints on a three-dimensional rendering of an environment in which robot 100 operates. In some implementations, user interface engine 158 may be operable by a user to cause robot 100 to enter a "training" mode in which the user may manually manipulate one or more operational components or robot 100 (e.g., end effector 106) along one or more paths, all while robot 100 continuously and/or periodically records its coordinates.

While robot 100 and control system 150 are depicted separately in FIG. 1, this is not meant to be limiting. In various implementations, one or more aspects (e.g., modules, engines, etc.) depicted in FIG. 1 as implemented on one of robot 100 or control system 150 may be implemented on the other, may be distributed across both, and/or may be distributed across one or both in combination with other components not depicted in FIG. 1. In implementations where robot 100 and control system 150 are separate, they may communicate over one or more wired or wireless networks (not depicted) or using other wireless technology, such as radio, Bluetooth, infrared, etc. In other implementations, control system 150 may be implemented entirely or in part using logic 102 of robot 100.

Also depicted in FIG. 1 are aspects of an environment in which robot 100 is to operate, e.g., using end effector 106, including an object 130 that robot 100 is to act upon and an environmental obstacle 132. These aspects of the environment are selected and depicted for illustrative purposes only, and any combination of objects or obstacles may be present in the environment. In some instances, object 130 to be acted upon by robot 100 may be an object to be moved from one location to another. For example, object 130 could be a key, a ball, a block, a brick, a machine component (e.g., to be inserted or attached to a machine such as an automobile), a computer component (e.g., to be installed into a computing system), and so forth. In some instances, object 130 may be an object to be otherwise acted upon by robot 100, such as a keyhole, a button, an object to be painted or welded, a location of a surface to be drilled, and so forth. Obstacle 132 may come in various forms, and may be static (e.g., remain at the same location within the environment) or dynamic (e.g., move around relative to the environment).

As an example of how components of FIG. 1 may work together, suppose a user inputs a task of "pick up egg, carry egg along path B to position above skillet, crack egg, empty egg contents into skillet, move egg shell along path C to position above trash, drop egg shell." Several of these actions, especially picking up and carrying the egg along path B, as well as cracking the egg, must be done carefully. Otherwise, undesirable results, such as pieces of egg shell falling into the skillet, may result. According, movement parameter engine 154 may take into account one or more attributes of the object to be acted upon—e.g., the fragility of the egg—as well as one or more attributes of the task, to determine that this task is one that should be performed slowly and carefully, not hastily. By contrast, suppose the user inputs a task of "pick up dirty clothes hamper, move hamper along path D to position above laundry chute, turn over hamper, return hamper to starting position." The hamper (object to be acted upon by robot 100) is not likely fragile, nor are its contents (dirty clothes). And the task to be performed (dumping dirty laundry) is not one that likely requires much in the way of delicacy. Assuming ample room for robot 100 to maneuver, and assuming an opening of the laundry chute is relatively large, movement parameter engine 154 may identify a suggested task-level movement parameter of "quick and deliberate."

As noted above, in various implementations, user interface engine 158 may be configured to provide, e.g., rendered on a graphical user interface, an indication of the suggested task-level movement parameter. For example, upon entering a task and other information about a scene, a user may be presented with a suggested task-level movement parameter such as "slow and precise," "deliberate," "quickly," and so forth. At that point the user may accept the suggested task-level movement parameter or provide another, user-defined task-level movement parameter.

A user may accept the suggested task-level movement parameter in a variety of ways, such as pressing a "confirm" button rendered on the screen, or by taking no action for a predetermined amount of time (e.g., three seconds). A user may effectively reject the suggested task-level movement parameter and define another task-level movement parameter in a variety of ways as well. For example, the user may click a "reject" button, and/or may provide other input indicative of the user desiring a different task-level movement parameter. For instance, the user could enter a numeric value along a range (e.g., 1-10), slide a slider along a range, select another predefined task-level movement parameter from a drop down menu, and so forth.

Based on the user's selection via user interface engine 158 of either the suggested task-level movement parameter or another, user-defined task-level movement parameter, movement parameter engine 154 may determine an "actual" or "realized" task-level movement parameter to be applied to movement of robot 100 while robot 100 performs the task. Movement parameter engine 154 may then identify, based on this "actual" or "realized" task-level movement parameter, a plurality of component-level movement parameters to be applied to a plurality of motion primitives implemented by one or more operational components 104 of robot 100 to perform the task.

As noted above, a task-level movement parameter may be a general setting that is applicable across multiple actions of a task and/or to multiple motion primitives implemented by multiple operational components 104 of robot 100 in order to complete the task. In various implementations, a task-level movement parameter may be mapped to one or more "action-level movement parameters" and/or "component-level movement parameters." "Action-level movement parameters" may affect how individual actions in a task are performed. For example, the task-level constraint "precise and slow" may translate to one action-level movement parameter for "pick up," another action-level movement parameter for "move," and yet another for "drop off."

"Component-level movement parameters" may affect how individual operational components 104 implement various motion primitives as part of their roles in performing actions of the task. For example, the task-level movement parameter "precise and slow" may translate (e.g., via a lookup table or other similar means) to a plurality of component-level movement parameters for a plurality of motion primitives implemented by one robot joint, and different component-level movement parameters for motion primitives implemented by another robot joint.

Component-level movement parameters may come in a variety of forms, depending on the nature of the operational component, the nature of the robot, and so forth. For example, one component-level movement parameter may be a measure of force and/or torque imparted by a particular operational component of the robot while implementing a motion primitive. For example, a gripper end effector may impart a different level of force when picking up an egg than when pickup up, for instance, a wood block. Another component-level movement parameter that may be related to force is a measure of velocity achieved by an operational component of the robot while implementing a motion primitive. For example, multiple operational components of a robot may move slower when the robot carries a drink than when, say, the robot carries a bag of dirty laundry.

Another component-level movement parameter may be a measure of mechanical impedance emulated by an operational component of the robot towards the environment in which the robot is to perform the task. Some tasks may require that the robot operate more "stiffly" (i.e. with higher mechanical impedance) than other tasks. Suppose the environment in which a robot is to operate is very well defined and static, and that attributes of an object to be acted upon by the robot in the environment (e.g., the object's location) are known to a high level of precision. In such case, it may be relatively safe, and perhaps even desirable, for the robot to operate with a relatively high level of mechanical impedance (i.e., stiffly). By contrast, suppose the environment in which a robot is to operate is more dynamic, and/or that attributes of an object to be acted upon by the robot are not known to such a high level of precision. In such case, it may be better for the robot to emulate a relatively low level of mechanical impedance towards the environment, e.g., so that the robot effectively operates with more "feel" and is able to react better to dynamic changes in the environment and/or to the object.

In some implementations, an action of a task may be associated with one or more error conditions. An "error condition" may be satisfied by various events, such as a collision of sufficient magnitude or component malfunction. Satisfaction of an error condition may cause the robot to transition from performing an action to performing an error handling action (e.g., stop). For example, an error condition associated with an action may be a collision (e.g., with an environmental obstacle) of a threshold magnitude of force. If a collision with an obstacle causes the robot to experience less than the threshold magnitude of force, the error condition is not satisfied. However, if a collision with an obstacle causes the robot to experience greater than the threshold magnitude of force, then the error condition is satisfied, and the robot may transition from performing the originally-intended action to an error handling action.

In some implementations, an error condition may be adjustable to be more or less likely to be satisfied (i.e. higher or lower sensitivity). For example, an error condition associated with an action may adjusted between a default, e.g., system-defined setting, and a "suggested" or "preferred" setting that is tailored to the specific task-level or action-level movement parameter(s) that are being applied to operation the current task and/or action. Suppose an action has been assigned an action-level movement parameter of "low mechanical impedance towards environment," e.g., a result of a larger task of which the action is part being assigned a task-level movement parameter of "delicate." A default sensitivity for the error condition "collision" may be automatically adjusted, e.g., based on the action-level movement parameter, to be lower (e.g., there may be unknown obstacles in the robot's environment and lightly colliding with those obstacles may not justify the robot stopping operation completely). In addition, in some implementations, sensitivity of an error condition associated with an action may be adjusted by a user, which may override the default and/or suggested error condition settings.

FIG. 2 depicts an example "TASK EDIT MODE" dialog that may be provided by user interface engine 158, in accordance with various implementations. A directed graph 270 and timeline 272 are depicted at bottom. In various implementations, each task and/or action may be represented by a graphical element that may be manipulated by a user to alter the task and/or action, as well as to arrange it chronologically relative to other tasks and/or actions. For example, directed graph 270 includes multiple tasks: "PICK UP AND PLACE OBJECT," "REGROUP," and "REPORT FOR MAINTENANCE." Each task may have multiple actions, such as "PICK UP OBJECT FROM SITE A," "CARRY OBJECT ALONG PATH B," "PLACE OBJECT AT SITE C," and so forth. In some implementations, a user may be able to "drag and drop" graphical elements representing individual actions across tasks, delete actions from tasks, reorder actions within tasks, add actions to tasks, reorder tasks relative to precede or follow other tasks (e.g., chronologically), group actions into tasks, and/or perform other similar operations using directed graph 270. In this example, directed graph 270 is organized chronologically from left to right, but this is not required.

Timeline 272 may indicate, e.g., with slider element 274, where real or simulated robot execution stands among the series of actions/tasks that form directed graph 270. In some implementations, a preview 276 may depict an animation of robot 100 simulating operation of the tasks represented by directed graph 270. In some implementations, a user may be able to advance forward or backward through timeline 272 at various rates of speed by dragging slider element 274 along timeline 272. In some implementations, preview 276 may depict robot 100 operating at a rate of speed that corresponds to how quickly the user slides slider element 274 along timeline 272. Thus, a user is able to run and view a simulation of robot 100 performing each action within each task. In some implementations, a user may be able to operate various controls 278, which may include, for instance, a "play" button, buttons to accelerate playback (e.g., x2, x10), and so forth. In some implementations, in addition to preview 276, various aspects of directed graph 270 may be animated (e.g., emphasized) to indicate, in real time, how the logic flows through the tasks and actions, as well as how the logic flows through any conditions that connect the tasks and actions (see FIGS. 3A and 3B).

Referring now to FIGS. 3A and 3B, another example graphical user interface is depicted. In FIG. 3A, like in FIG. 2, a directed graph 270 includes a plurality of graphical elements representing actions (e.g., "MOVE OBJECT INTO MACHINE," "ORIENT OBJECT WITHIN MACHINE," etc.) and tasks ("PICK UP AND PLACE OBJECT," "START PROCESSING"). In FIG. 3A, there is a series of conditionals at far left that control operation of the actions and tasks. In this example, if "CONDITIONAL 1" is met, the actions and tasks shown in FIG. 3A are implemented by a robot. However, "CONDITIONAL 2" and "CONDITIONAL 3" represent two alternative logical paths that may be taken by robot 100 if certain conditions hold true or false.

In some implementations, a user may be able to view actions and tasks associated with each conditional path by clicking or otherwise selecting the path. For example, in FIG. 3A, if a user were to click on the block labeled "IF CONDITIONAL 2", the graphical user interface may change into that depicted in FIG. 3B, in which the actions and tasks associated with the logical path of "CONDITIONAL 2" are depicted. In some implementations, a user may additionally or alternatively be able to "zoom in" or "zoom out" on a graphical user interface such as that depicted in FIGS. 3A and 3B. The closer the user zooms in, the more details about each action may be depicted. If the user zooms out, on the other hand, less details about individual actions may be rendered within each graphical element.

Figure 4:
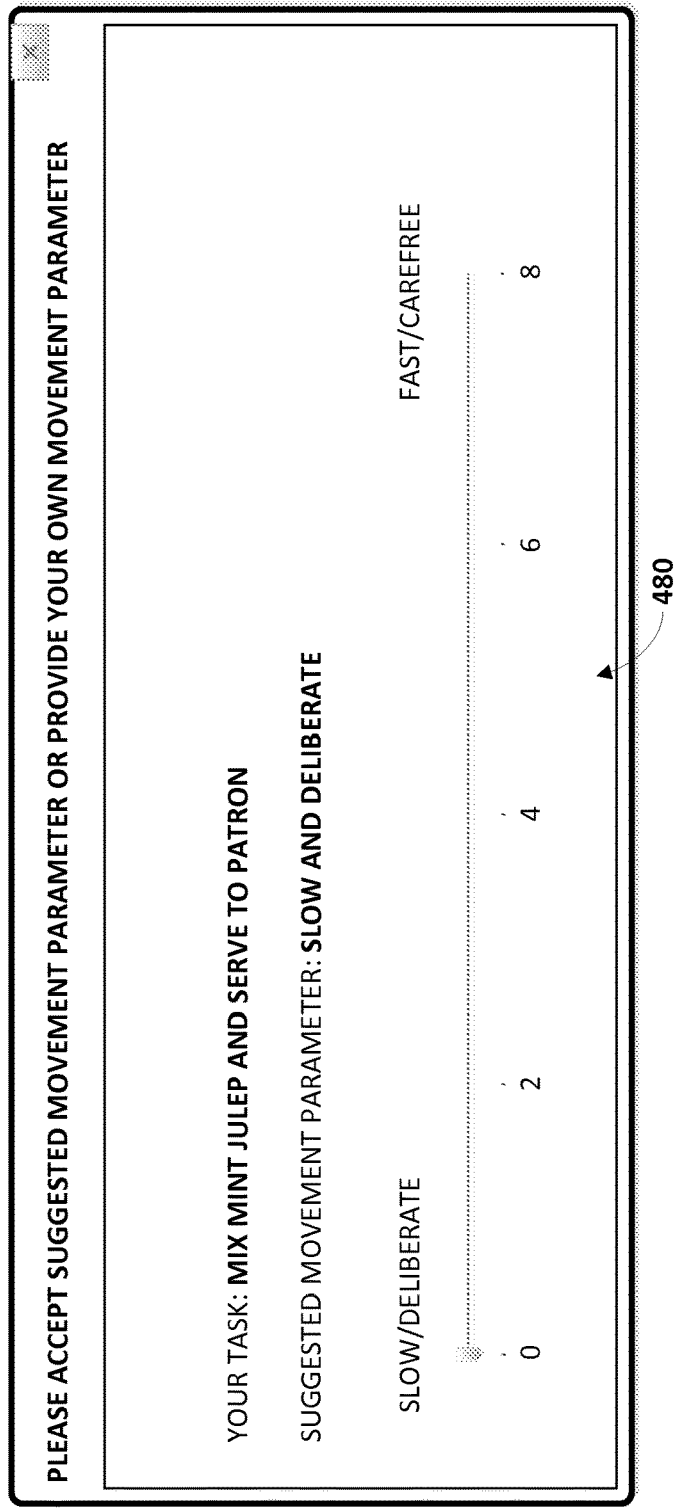

FIG. 4 depicts another example dialog that may be provided by user interface engine 158. In FIG. 4, a slider 480 is depicted that represents a range of task-level movement parameters that may be implemented by a robot while performing a task. The range, numeric values, and task-level movement parameter labels depicted in FIG. 4 and described elsewhere herein are selected for illustrative purposes only, and are not meant to be limiting in any way. In various implementations, slider bar 480 may be operable by a user to set a task-level movement parameter to a value along the depicted range. This range may be, for instance, numeric, and/or it may be verbal; e.g., slow and precise on one end and fast and carefree on the other. Slider bar 480, when initially rendered, may be set at a value that corresponds to the suggested task-level movement parameter. For example, in FIG. 4, the robot task ("Mix mint julep and serve to patron") is one that requires care and delicacy, and so the suggested task-level movement parameter is "slow and deliberate," and slider bar 480 is set to this value (i.e. all the way to the left). The user may have the option of accepting that value, or operating slider bar 480 to select a different value. Of course, in other implementations, graphical elements other than slider bars may be used, such as drop down menus, dials, knobs, text entry fields, and so forth.

Figure 5:
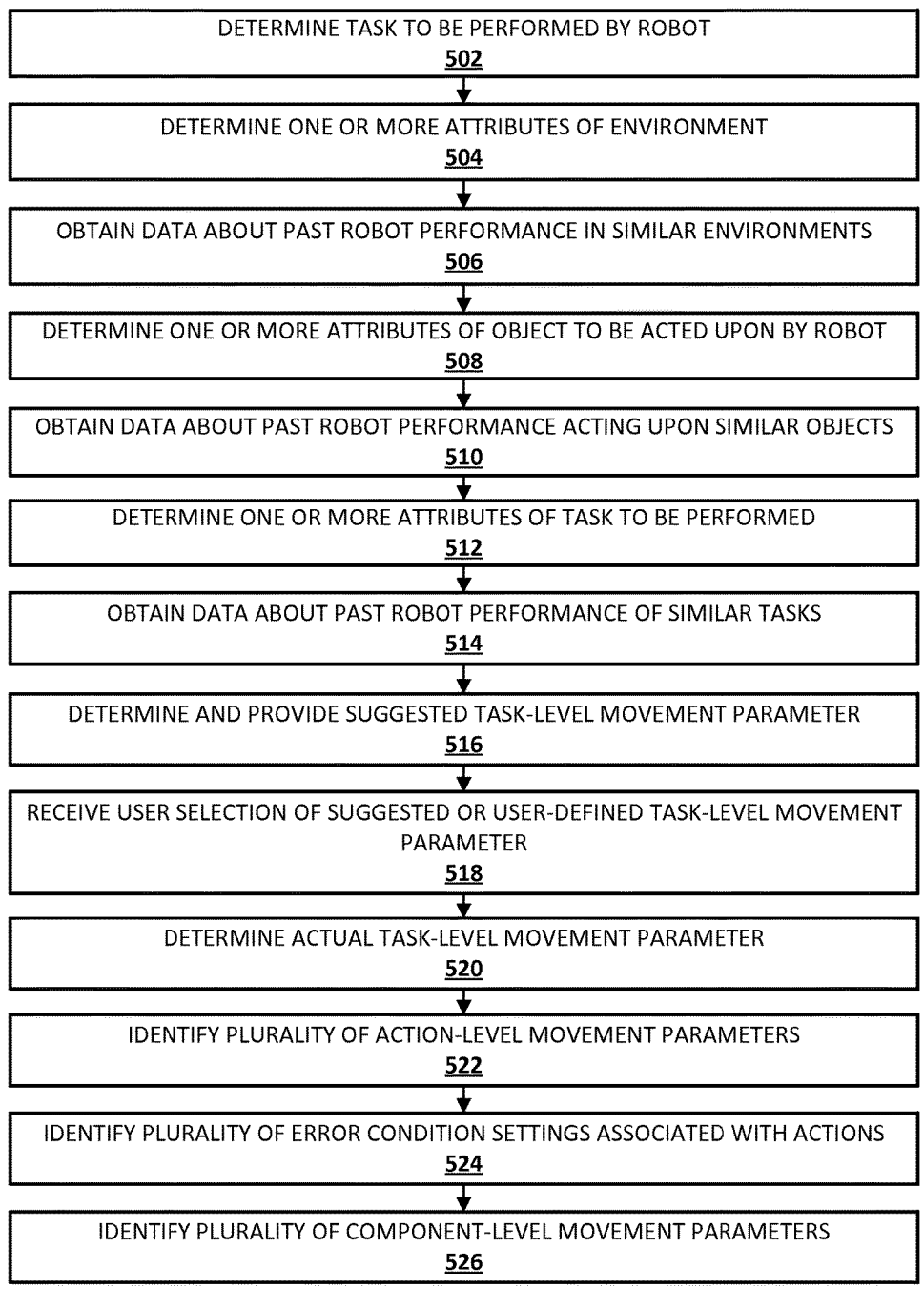
FIG. 5 depicts a flow chart illustrating an example method of suggesting, selecting, and applying task-level movement parameters to implementation of robot motion primitives, in accordance with various implementations.

Referring now to FIG. 5, an example method 500 of suggesting, selecting, and applying task-level movement parameters to implementation of robot motion primitives is described. For convenience, the operations of flow charts are described with reference to a system that performs the operations. This system may include various components of various computer systems, including computing elements of robot 100 and/or control system 150. Moreover, while operations of method 500 are shown in a particular order, this is not meant to be limiting. One or more operations may be reordered, omitted or added.

At block 502, the system may determine a task to be performed by a robot. For example, a user may interact with user interface engine 158 of control system 150 to provide one or actions and/or tasks to be performed by robot 100. In some implementations, the user may operate an interface such as those depicted in FIGS. 2 and 3A-B to add and/or arrange various actions into tasks, e.g., along timeline 272.

At block 504, the system may determine one or more attributes of an environment in which the robot is to perform the task. These environmental attributes may include but are not limited to obstacles (both static and dynamic), boundaries, conditions (e.g., temperature, humidity, etc.), and so forth. The system may learn about the environment from various sources. For example, the user could operate user interface engine 158 to provide information about the environment. Additionally or alternatively, one or more sensors 108 of robot 100 and/or other sensors separate from robot 100 (e.g., sensors associated with control system 150), particularly cameras, range finders, radar components, GPS components, and so forth, may provide data that the system may use to determine one or attributes of the environment.

At block 506, the system may obtain, e.g., from index 157 associated with past robot operation engine 156, data about past robot performance in the same environment or in environments having one or more attributes in common with the current working environment. For instance, suppose the current working environment is a confined laboratory full of expensive scientific equipment. Past robot operation engine 156 may obtain, e.g., from index 157, data pertaining to past robot operation in confined environments with potentially fragile and/or expensive obstacles contained therein.

At block 508, the system may determine one or more attributes of an object to be acted up by the robot while performing the task. These object attributes may include but are not limited to the object's fragility, desired or required orientation (e.g., an open topped container full of fluid must remain upright), a configuration of the object, and so forth. The system may learn about the object from various sources. The user could operate user interface engine 158 to provide information about the object. Additionally or alternatively, one or more sensors 108 of robot 100 and/or other sensors separate from robot 100 (e.g., sensors associated with control system 150), may provide data that the system may use to determine one or attributes of the object. At block 510, the system may obtain, e.g., from index 157 associated with past robot operation engine 156, data about past robot performance on the same or similar objects (e.g., objects having attributes in common with the current object to be acted upon).

At block 512, the system may determine one or more attributes of the task to be performed by the robot. These task attributes may include but are not limited to a duration of the task, how many times the task is to be repeated, any time constraints associated with the task, and so forth. The system may learn about the task from various sources. For example, the user could operate one or more dialogs provided by user interface engine 158 to provide information about the task to be performed by the robot. At block 514, the system may obtain, e.g., from index 157 associated with past robot operation engine 156, data about past robot performance of the same or similar tasks.

At block 516, the system may determine and provide, e.g., via user interface engine 158 as a dialog, a "suggested" task-level movement parameter. This determination may be made by the system based on one or more of the determinations made and/or data received at blocks 502-514. FIG. 4 depicts one example dialog that may be provided at block 516, in accordance with various implementations. At block 518, the system may receive, e.g., at user interface engine 158, a user selection of the suggested task-level movement parameter or a user-defined task-level movement parameter. In some implementations, for instance, the user may operate (e.g., using a touch screen) a slider bar such as slider bar 480 depicted in FIG. 4 to alter the suggested task-level movement parameter to a desired task-level movement parameter.

At block 520, the system may determine, e.g., based on the user selection received at block 518, an "actual" task-level movement parameter that is to be implemented by the robot while it performs the task. At block 522, the system may determine, e.g., based on the actual task-level movement parameter determined at block 520, one or more action-level movement parameters to be applied to one or actions that form part of the task. For example, suppose a task comprises the actions, "move to drink, grab drink, move drink to patron, place drink on patron's table, move back to start." Considering the delicate nature of the object to be acted upon (e.g., the glass holding the drink may be fragile, liquid may be spilled if the drink is moved too hastily, etc.), a task-level movement parameter of "slow and careful" may be applied to this task. However, some actions of the task, such as "move to drink" and "move back to start," may be performed by the robot while not holding the drink, and hence may not require the same delicacy as some of the intermediate steps. Accordingly, the system, e.g., by way of movement parameter engine 154, may determine that the first and last actions should be implemented with a "less slow and less careful" action-level movement parameter than the intermediate actions.

In some implementations, at block 524, the system may identify, e.g., based on the actual task-level movement parameter determined at block 520 and/or the action-level movement parameters determined at block 522, a plurality of error condition settings to associate with the plurality of actions. For example, if one or more actions are being performed by robot with a high level of impedance (e.g., very stiffly), error conditions corresponding to those actions may be set to higher levels of sensitivity.

At block 526, the system may determine, e.g., based on the actual task-level movement parameter determined at block 520 and/or on the one or more action-level movement parameters determined at block 522, a plurality of component-level movement parameters to be applied to implementation of a plurality of motion primitives by a plurality of operational components (e.g., 104) of the robot. In various implementations, one component-level movement parameter may affect operation of one operational component differently than another component-level movement parameter affects operation of another operational component.

Figure 6:
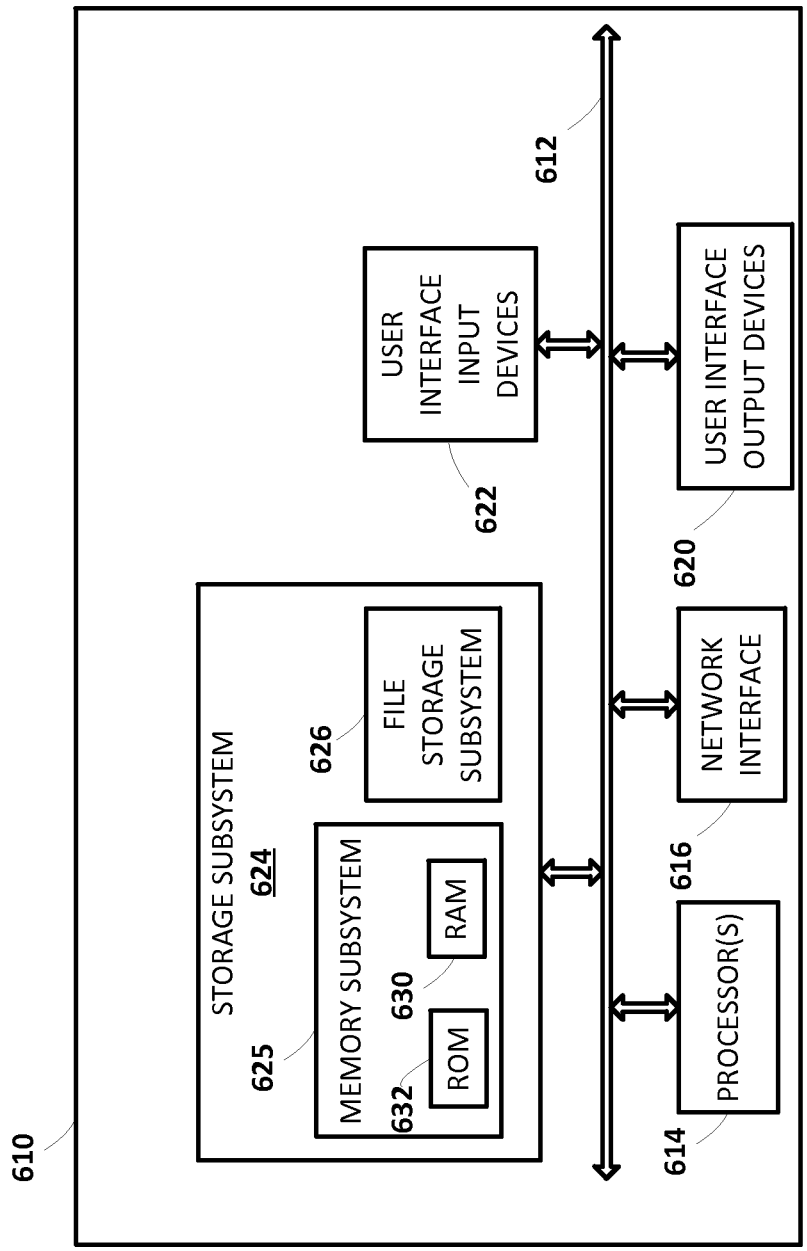
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more aspects of logic 102, path planning engine 152, movement parameter engine 154, past robot operation engine 156, and/or user interface engine 158. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   determining, by one or more processors, a task to be performed by a robot in an environment;
   determining, by one or more of the processors, based on the task to be performed by the robot and past behavior by robots while performing tasks similar to the task, a suggested task-level movement parameter for application to movement of the robot while performing the task;
   providing, by one or more of the processors, via a graphical user interface, an indication of the suggested task-level movement parameter;
   receiving, by one or more of the processors, via the graphical user interface, a selection of the suggested task-level movement parameter or a user-defined task-level movement parameter;
   determining, by one or more of the processors, based on the received selection, an actual task-level movement parameter to be applied to movement of the robot while performing the task;
   identifying, by one or more of the processors, based on the actual task-level movement parameter, a plurality of component-level movement parameters to be applied to a plurality of motion primitives implemented by one or more operational components of the robot to perform the task; and
   operating, by one or more of the processors, the one or more operational components of the robot to implement the plurality of motion primitives pursuant to the plurality of component-level movement parameters.

2. The computer-implemented method of claim 1, further comprising determining, by one or more of the processors, one or more physical attributes of an object to be acted upon by a robot while the robot performs the task, wherein the suggested task-level movement parameter is determined based on past behavior by robots while acting upon objects similar to the object to be acted upon by the robot while performing the task.

3. The computer-implemented method of claim 1, wherein the suggested task-level movement parameter is determined based on past behavior by robots while operating in environments similar to the environment in which the robot is to perform the task.

4. The computer-implemented method of claim 1, wherein identifying the plurality of component-level movement parameters comprises:
   identifying, by the one or more processors, based on the actual task-level movement parameter, a plurality of action-level movement parameters to be applied to a plurality of actions implemented by the robot to perform the task; and
   identifying, by the one or more processors, based on a given action-level movement parameter of the plurality of action-level movement parameters, one or more component-level movement parameters to be applied to one or more motion primitives implemented by one or more operational components of the robot to perform a given action associated with the given action-level movement parameter.

5. The computer-implemented method of claim 4, wherein the method further comprises selecting, by the one or more processors, based on one or more of the actual task-level movement parameter and the given action-level movement parameter, a sensitivity of an error condition associated with the given action, wherein the robot transitions from performing the given action to performing an error condition action on satisfaction of the error condition.

6. The computer-implemented method of claim 1, wherein determining the suggested task level movement is based at least in part on output from a machine learning model that is trained using training examples of past instances of the robot or other robots performing the tasks similar to the task.

7. The computer-implemented method of claim 1, wherein the identifying comprises:
   identifying, based on the actual task-level movement parameter, a first component-level movement parameter to be applied to a first motion primitive implemented by a first operational component of the robot to perform the task; and
   identifying, based on the actual task-level movement parameter, a second component-level movement parameter to be applied to a second motion primitive implemented by a second component of the robot to perform the task;
   wherein the first component-level movement parameter affects operation of the first operational component differently than the second component-level movement parameter affects operation of the second operational component.

8. The computer-implemented method of claim 1, further comprising rendering, by the one or processors, as an element of the graphical user interface, a directed graph with a graphical element to represent the task.

9. The computer-implemented method of claim 8, further comprising rendering, by the one or more processors, as elements of the directed graph, additional graphical elements representing at least two actions, wherein the at least two actions together form at least part of the task.

10. The computer-implemented method of claim 8, wherein the graphical element is a first graphical element, the task is a first task, and the method further comprises:
    rendering, by the one or processors, as part of the directed graph, a second graphical element representing a second task;
    wherein the second graphical element is arranged in the directed graph chronologically before or after the first graphical element based on user input indicative of one of the first and second graphical elements having been dragged to a position preceding or following the other graphical element in the directed graph.

11. The computer-implemented method of claim 1, wherein at least one of the plurality of component-level movement parameters comprises a measure of force imparted by one of the operational components of the robot while implementing one of the motion primitives.

12. The computer-implemented method of claim 1, wherein at least one of the plurality of component-level movement parameters comprises a measure of mechanical impedance emulated by one of the operational components of the robot towards the environment in which the robot is to perform the task.

13. The computer-implemented method of claim 1, wherein at least one of the plurality of component-level movement parameters comprises a velocity achieved by an operational component of the robot while implementing one of the motion primitives.

14. A computer-implemented method comprising:
    determining, based on a task to be performed by a robot and an aggregate amount of information known about an environment in which the robot is to perform the task, a suggested task-level movement parameter for application to movement of the robot while performing the task;
    providing output indicative of the suggested task-level movement parameter;
    receiving input indicative of user selection of the suggested task-level movement parameter or a user-defined task-level movement parameter;
    determining, based on the received input, an actual task-level movement parameter to be applied to movement of the robot while performing the task;
    identifying, based on the actual task-level movement parameter, a plurality of component-level movement parameters to be applied to a plurality of motion primitives implemented by one or more operational components of the robot to perform the task; and
    operating the one or more operational components of the robot to implement the plurality of motion primitives pursuant to the plurality of component-level movement parameters.

15. The computer-implemented method of claim 14, further comprising:
    identifying, based on the actual task-level movement parameter, a plurality of action-level movement parameters to be applied to a plurality of actions implemented by the robot to perform the task; and
    identifying, based on a given action-level movement parameter of the plurality of action-level movement parameters, one or more component-level movement parameters to be applied to one or more motion primitives implemented by one or more operational components of the robot to perform an action associated with the given action-level movement parameter.

16. The computer-implemented method of claim 14, wherein the aggregate amount of information known about the environment is determined based at least in part on a determination that the environment is dynamic.

17. The computer-implemented method of claim 14, wherein the suggested task-level movement parameter is further determined based on past behavior by robots while performing tasks similar to the task.

18. A system comprising one or more processors and memory operably coupled with the one or more processors, wherein the memory stores instructions that, in response to execution of the instructions by one or more processors, cause the one or more processors to:
- determine a task to be performed by a robot in an environment;
- determine, based on the task to be performed by the robot and past behavior by robots while performing tasks similar to the task, a suggested task-level movement parameter for application to movement of the robot while performing the task;
- provide, via a graphical user interface, an indication of the suggested task-level movement parameter;
- receive, via the graphical user interface, a selection of the suggested task-level movement parameter or a user-defined task-level movement parameter;
- determine, based on the received selection, an actual task-level movement parameter to be applied to movement of the robot while performing the task;
- identify, based on the actual task-level movement parameter, a plurality of component-level movement parameters to be applied to a plurality of motion primitives implemented by one or more operational components of the robot to perform the task; and
- operate the one or more operational components of the robot to implement the plurality of motion primitives pursuant to the plurality of component-level movement parameters.

19. The system of claim 18, wherein the suggested task-level movement parameter is determined based on past behavior by robots while operating in environments similar to the environment in which the robot is to perform the task.

20. The system, of claim 18, wherein determining the suggested task level movement is based at least in part on output from a machine learning model that is trained using training examples of past instances of the robot or other robots performing the tasks similar to the task.

* * * * *